(12) United States Patent
French, Jr.

(10) Patent No.: US 10,481,628 B2
(45) Date of Patent: Nov. 19, 2019

(54) SURFACING OF SUBSYSTEM POWER CONSUMPTION ON AN AGRICULTURAL MACHINE

(71) Applicant: Deere & Company, Moline, IL (US)

(72) Inventor: William D. French, Jr., Bettendorf, IA (US)

(73) Assignee: Deere & Company, Moline, IL (US)

( * ) Notice: Subject to any disclaimer, the term of this patent is extended or adjusted under 35 U.S.C. 154(b) by 440 days.

(21) Appl. No.: 14/862,490

(22) Filed: Sep. 23, 2015

(65) Prior Publication Data
US 2017/0083035 A1 Mar. 23, 2017

(51) Int. Cl.
| | | |
|---|---|---|
| *G05F 1/66* | (2006.01) | |
| *G05B 15/02* | (2006.01) | |
| *A01D 41/127* | (2006.01) | |
| *A01B 79/00* | (2006.01) | |

(52) U.S. Cl.
CPC ............. *G05F 1/66* (2013.01); *A01D 41/127* (2013.01); *G05B 15/02* (2013.01); *A01B 79/005* (2013.01)

(58) Field of Classification Search
CPC ....... G05F 1/66; A01B 79/005; A01D 41/127; G05B 15/02
See application file for complete search history.

(56) References Cited

U.S. PATENT DOCUMENTS

| | | | | |
|---|---|---|---|---|
| 4,513,562 A | * | 4/1985 | Strubbe | A01D 41/127 56/10.2 G |
| 4,893,241 A | * | 1/1990 | Girodat | A01D 41/1274 56/10.2 G |
| 4,934,985 A | * | 6/1990 | Strubbe | A01D 41/127 460/4 |
| 6,195,604 B1 | * | 2/2001 | Moore | A01B 79/005 342/357.52 |
| 7,921,626 B2 | * | 4/2011 | Maertens | A01D 41/1276 56/10.2 G |
| 2009/0240465 A1 | * | 9/2009 | Chervenka | A01D 41/127 702/147 |
| 2010/0010713 A1 | * | 1/2010 | Sheidler | A01D 41/127 701/50 |
| 2011/0266858 A1 | * | 11/2011 | Laux | A01B 33/02 299/1.5 |

FOREIGN PATENT DOCUMENTS

| | | |
|---|---|---|
| EP | 0347979 A1 | 12/1989 |
| EP | 2529610 A1 | 12/2012 |
| WO | 2013013915 A1 | 1/2013 |
| WO | WO2013/013915 * | 1/2013 |

OTHER PUBLICATIONS

Extended EP Search Report Application No. 16184346.1, dated Jan. 2, 2017, 7 pages.

* cited by examiner

*Primary Examiner* — Yasser A Abdelaziez
(74) *Attorney, Agent, or Firm* — Christopher R. Christenson; Kelly, Holt & Christenson PLLC

(57) ABSTRACT

Power consumption is sensed for individual subsystems of an agricultural machine. Visual indicia are generated, that are indicative of the sensed power consumption, for each individual subsystem. A user interface mechanism is controlled to display the visual indicia, indicating power consumption of the individual subsystems on the harvesting machine.

21 Claims, 11 Drawing Sheets

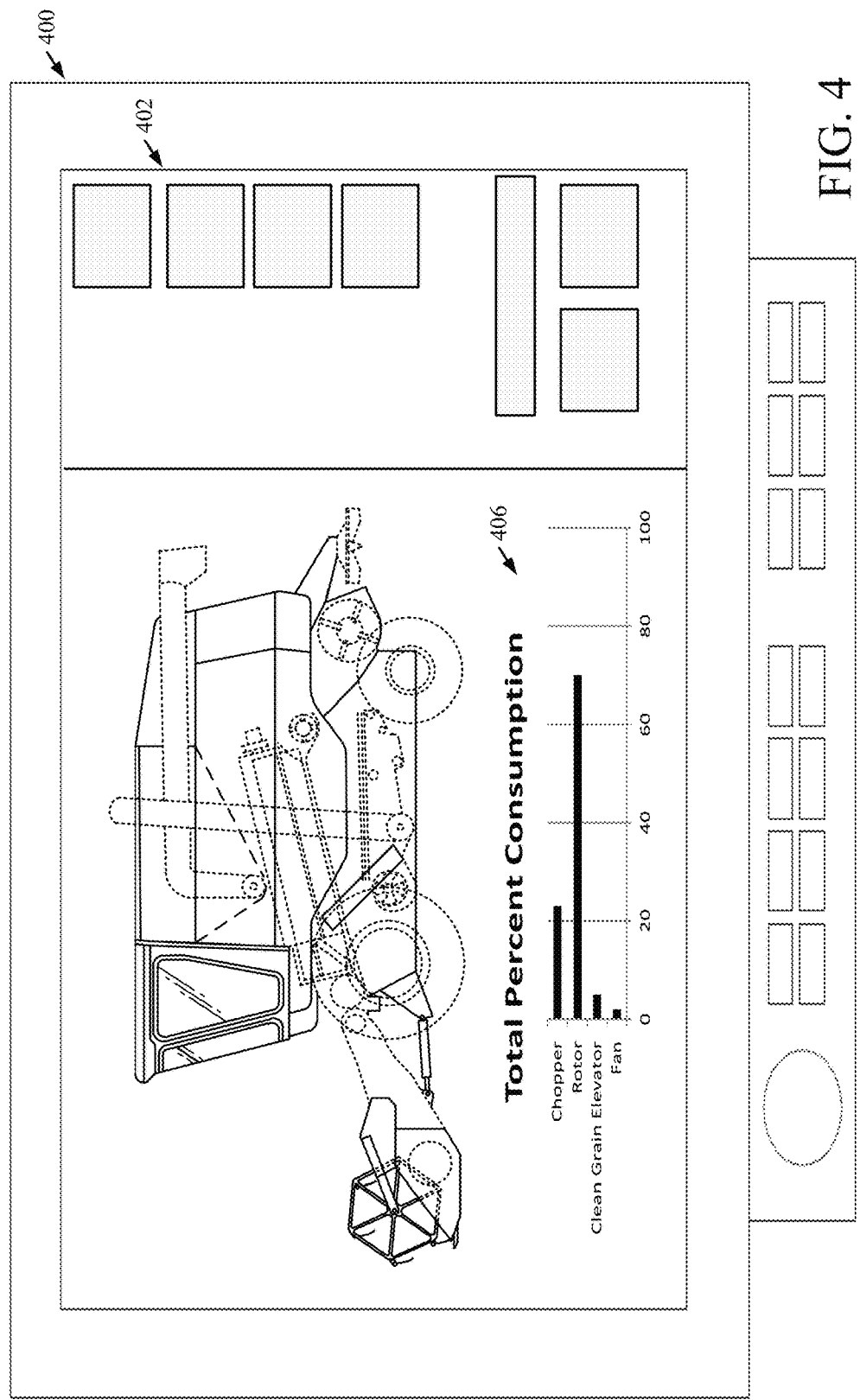

US 10,481,628 B2

SURFACING OF SUBSYSTEM POWER CONSUMPTION ON AN AGRICULTURAL MACHINE

FIELD OF THE DESCRIPTION

The present disclosure relates to agricultural equipment. More particularly, the present disclosure relates to monitoring power consumption by subsystems of a piece of agricultural equipment.

BACKGROUND

There are a wide variety of different types of agricultural machines in use. Some agricultural machines are used for harvesting, planting, tillage, spraying or other operations.

By way of example, harvesting equipment can include equipment that harvests grain. Harvesting grain is a very power-intensive process. In fact, in some conditions, the harvesting capacity of a machine is limited by available machine power.

Such harvesting machines often have multiple different subsystems that are operational simultaneously. The power used in the harvesting operation can be affected by machine settings for the various subsystems. An operator can often make adjustments to various subsystems in order to modify the operation of those subsystems, or to modify the operation of the harvester as a whole. Modification of the operation of a subsystem can also change the power consumed by that subsystem.

The discussion above is merely provided for general background information and is not intended to be used as an aid in determining the scope of the claimed subject matter.

SUMMARY

Power consumption is sensed for individual subsystems of an agricultural machine. Visual indicia are generated, that are indicative of the sensed power consumption, for each individual subsystem. A user interface mechanism is controlled to display the visual indicia, indicating power consumption of the individual subsystems on the harvesting machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-6 show different examples of visual indicia that can be generated to indicate power consumption of subsystems of an agricultural machine.

DETAILED DESCRIPTION

Figure 1:
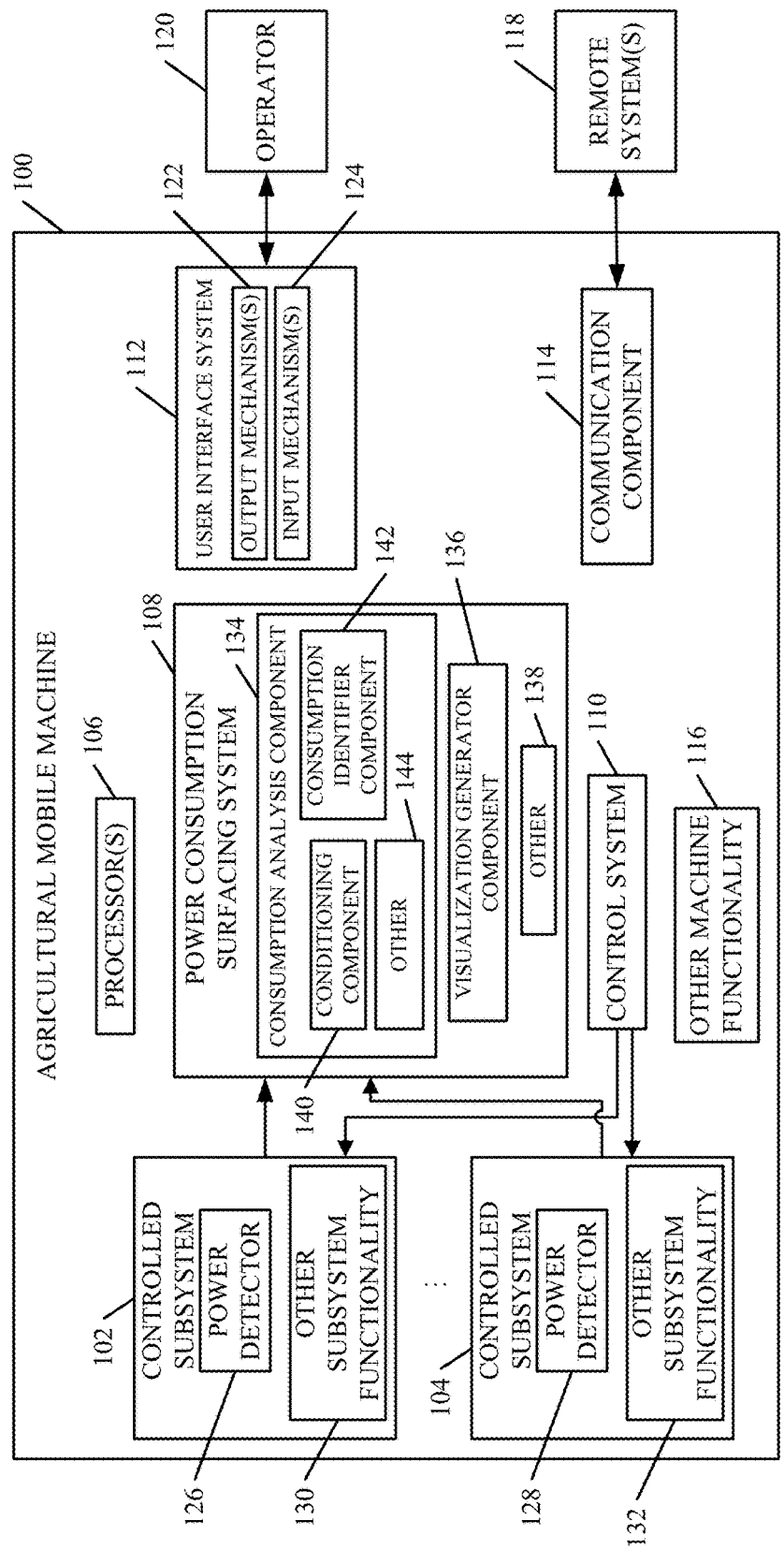
FIG. 1 is a block diagram of one example of an agricultural mobile machine.

FIG. 1 is a block diagram of one example of an agricultural mobile machine 100. In the example shown in FIG. 1, machine 100 illustratively includes a set of controlled subsystems 102-104, one or more processors or servers 106, and a power consumption surfacing system 108. Machine 100 can also include control system 110, user interface system 112, communication component 114, and it can include other items 116. FIG. 1 shows that machine 100 can communicate with one or more remote systems 118 and can be controlled by an operator 120. In one example, user interface system 112 illustratively includes a set of output mechanisms 122 and a set of input mechanisms 124. Output mechanisms 122 illustratively output data or other information to operator 120. They can include a wide variety of different types of mechanisms, such as different types of display devices, audio devices, haptic devices, etc.

Input mechanisms 124 illustratively include a set of input mechanisms that operator 120 can use to provide inputs for controlling and manipulating agricultural mobile machine 100. The input mechanisms 124 can include settings input mechanisms that can be used to set operator adjustable settings on machine 100. They can also include a wide variety of other input mechanisms, such as a steering wheel, foot pedals, levers, buttons, keypads, joysticks, etc. In addition, they can include user actuatable icons or links or other controls on a user interface display. These and additional examples of output mechanisms 122 and input mechanisms 124 are described in greater detail below. Operator 120 provides inputs to the control system 110 and to other machine functionality 116 in order to control the operation and functioning of agricultural mobile machine 100.

In the example shown in FIG. 1, each of the controlled subsystems 102-104 is controllable by operator 120. Each subsystem includes a power detector 126-128, and other subsystem functionality 130-132. The power detectors 126-128 illustratively detect power consumed by the corresponding individual, controlled subsystem 102-104. The other subsystem functionality 130-132 illustratively performs functions corresponding to that particular subsystem. For instance, where the machine is a combine and a subsystem is a threshing subsystem, the other subsystem functionality may include functionality for the threshing concave and rotor, as well as functionality for controlling the concave clearance, rotor speed, etc. Where the subsystem is the cleaning subsystem, the other functionality may include the cleaning fan, chaffer and sieve, and the functionality for controlling the fan speed, and the chaffer and sieve openings. These are examples only.

The power detectors 126-128 are thus configured to detect power consumed by the individual subsystems. Therefore, those detectors may vary with the particular subsystem for which they are detecting power consumption. They provide output signals to power consumption surfacing system 108 which illustratively includes consumption analysis component 134 and visualization generator component 136. Power consumption surfacing system 108 can include other items 138 as well.

Consumption analysis component 134 illustratively includes a conditioning component 140, a consumption identifier component 142, and it can include other items 144. Conditioning component 140 illustratively receives the sensor signals from power detectors 126-128 and performs any desired conditioning. The conditioning can include, for instance, amplification, linearization, normalization, etc. It provides the conditioned signals to consumption identifier component 142 which identifies the power consumption for each of the individual, controlled subsystems 102-104, based on the input from the corresponding power detectors 126-128. Visualization generator component 136 then generates a visualization that includes indicia indicative of the power consumed by each of the individual subsystems, and provides that visualization to user interface system 112. User interface system 112 illustratively controls a visual output mechanism 122 to surface the power consumption data, through the generated visualization, to operator 120.

Figure 2:
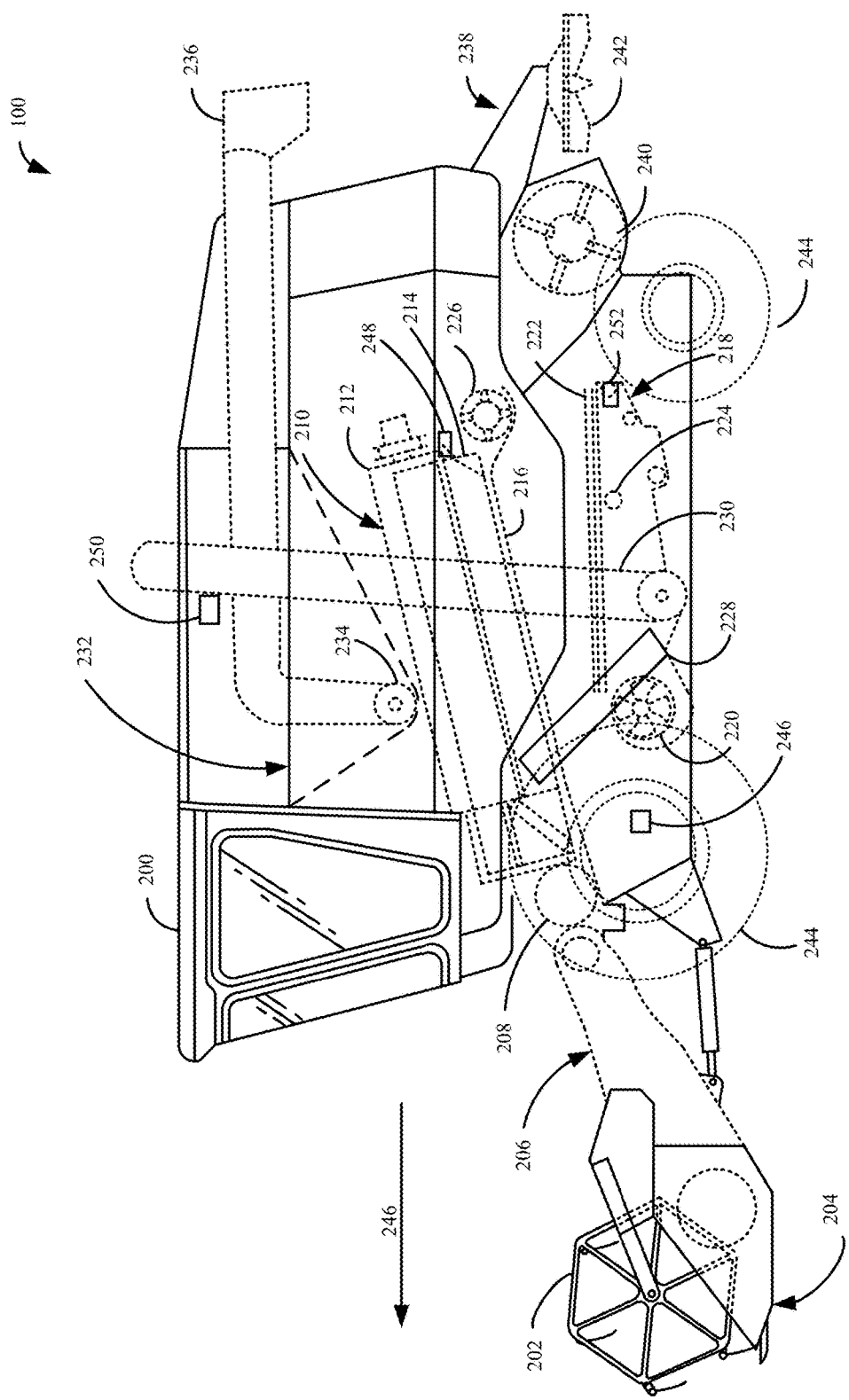
FIG. 2 is a block diagram showing an example in which the agricultural mobile machine is a combine.

FIG. 2 is a partial pictorial, partial schematic view of an example in which the agricultural machine 100 is a combine. It can be seen in FIG. 2 that combine 100 illustratively includes an operator compartment 200, and a set of front end equipment that can include header 202, and a cutter generally indicated at 204. It can also include a feeder house 206, a feed accelerator 208, and a thresher generally indicated at 210. Thresher 210 illustratively includes a threshing rotor 212 and a set of concaves 214. Further, combine 100 can include a separator 216 that includes a separator rotor. Combine 102 can include a cleaning subsystem (or cleaning shoe) 218 that, itself, can include a cleaning fan 220, chaffer 222 and sieve 224. The material handling subsystem in combine 102 can include (in addition to a feederhouse 206 and feed accelerator 208) discharge beater 226, tailings elevator 228, clean grain elevator 230 (that moves clean grain into clean grain tank 232) as well as unloading auger 234 and spout 236. Combine 102 can further include a residue subsystem 238 that can include chopper 240 and spreader 242. Combine 102 can also have a propulsion subsystem that includes an engine that drives ground engaging wheels 244 or tracks, etc. It will be noted that combine 102 may also have more than one of any of the subsystems mentioned above (such as left and right cleaning shoes, separators, etc.).

In operation, and by way of overview, combine 102 illustratively moves through a field in the direction indicated by arrow 246. As it moves, header 202 engages the crop to be harvested and gathers it toward cutter 204. After it is cut, it is moved by a conveyor in feeder house 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 102 toward the residue handling subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well.

FIG. 2 also shows that, in one example, combine 102 can include ground speed sensor 246, one or more separator loss sensors 248, a clean grain camera 250, and one or more cleaning shoe loss sensors 252. Ground speed sensor 246 illustratively senses the travel speed of combine 102 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, sensors 252 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 252 can comprise only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also comprise only a single sensor, instead of separate left and right sensors.

It will also be appreciated that sensors 102 in FIG. 1 (in addition to the sensors already described) can include other sensors on combine 100 as well. For instance, they can include a machine state sensor that is configured to sense whether machine 100 is configured to chop the residue, drop a windrow, etc. They can include cleaning shoe fan speed sensors that can be configured proximate fan 220 to sense the speed of the fan. They can include a material other than grain (MOG) moisture sensor that can be configured to sense the moisture level of the material other than grain that is passing through machine 100. They can include machine setting sensors that are configured to sense the various configurable settings on machine 100. They can also include a machine orientation sensor that can be any of a wide variety of different types of sensors that sense the orientation of machine 100. The sensed orientation can identify the orientation of machine 100, or the position of parts of machine 100 relative to other parts, or relative to the ground (such as a the height of header 202 above the ground) etc. Crop property sensors can sense a variety of different types of crop properties, such as crop type, crop moisture, and other crop properties. They can also be configured to sense characteristics of the crop as they are being processed by machine 100. For instance, they can sense grain feed rate, as it travels through clean grain elevator 230. They can sense mass flow rate through elevator 230, or provide other output signals indicative of similar variables.

Figure 3A:
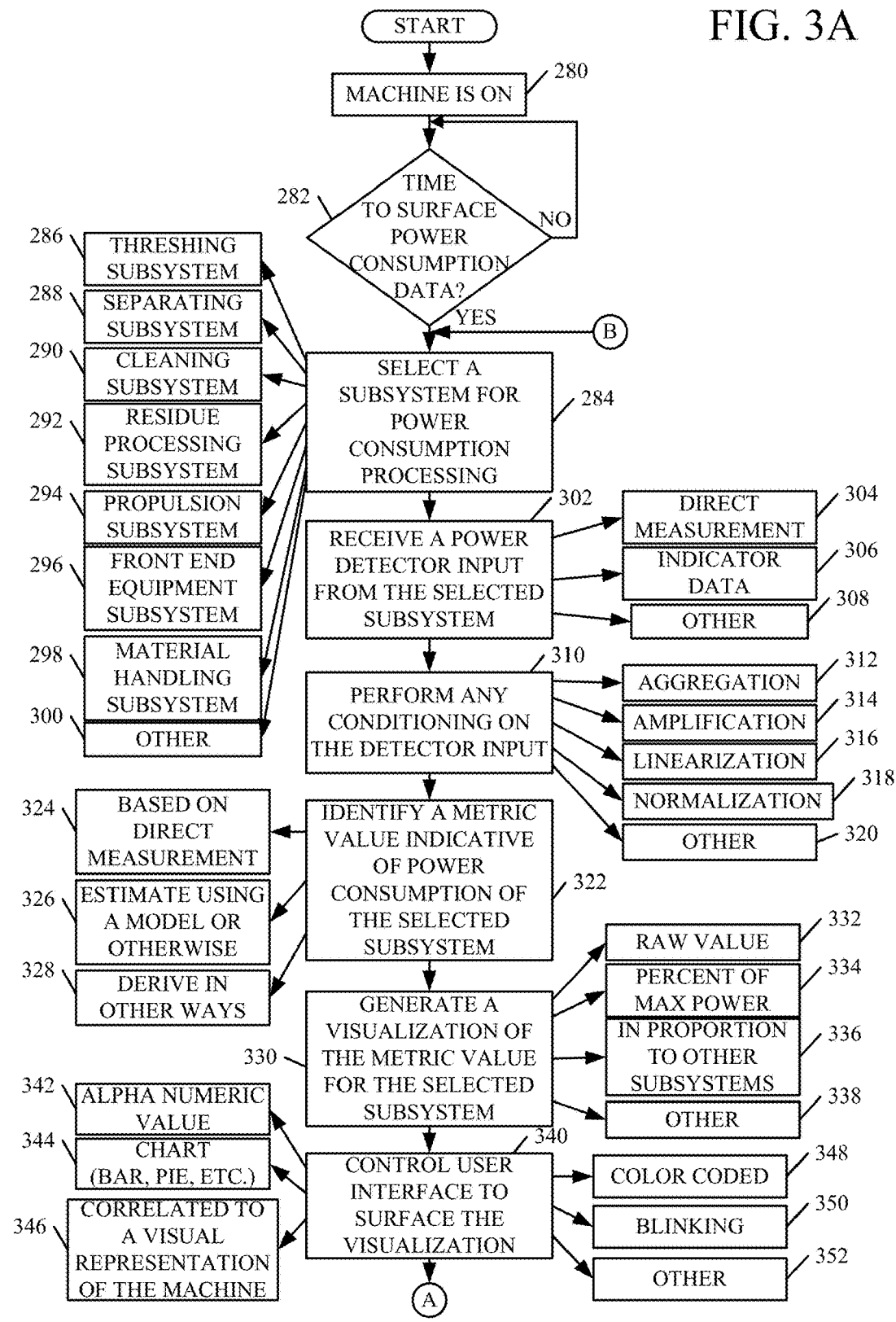
FIGS. 3A and 3B (collectively referred to herein as FIG. 3) show a flow diagram illustrating one example of the operation of the agricultural mobile machine in surfacing power consumption data for subsystems.
Figure 3B:
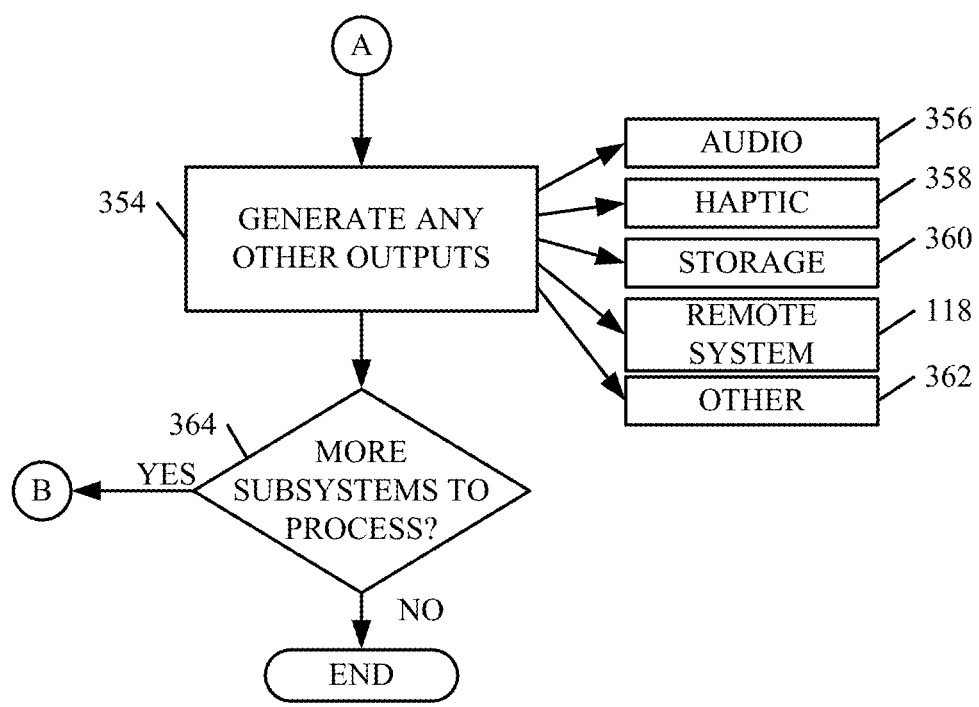

FIGS. 3A and 3B (collectively referred to herein as FIG. 3) show is a flow diagram illustrating one example of the operation of power consumption surfacing system 108 in surfacing power consumption for various subsystems of a combine. It is first assumed that the combine is turned on, and is operational. This is indicated by block 280 in FIG. 3.

In one example, power consumption surfacing system 108 intermittently updates the power consumption visualization and surfaces it for operator 120. This can be done periodically. In another example, it can be done by being triggered from various triggering criteria. For instance, if the power consumed by a given subsystem changes by a threshold amount, or changes quickly, this may trigger an update of the power consumption data. In yet another example, the power consumption data is substantially continuously updated, and the visualization is updated in real time, or near real time.

It will also be noted that the visualization need not be continuously displayed to the user. Instead, it may be displayed intermittently or at the request of the user. It may be one of a plurality of different displays that are displayed on a display screen or other display device. In such an example, the user can toggle through various displays, one of which may be a subsystem display showing power consumption for all of the subsystems, for the subsystems individually, for different groups of the subsystems, or for different components of each of the subsystems, etc.

In the example shown in FIG. 3, power consumption surfacing system 108 illustratively determines that it is time to surface power consumption data for the user. This is indicated by block 282.

It may be that power consumption for an individual subsystem (or for individual components of a subsystem), are processed one at a time, in a desired sequence. In another example, the power consumption may be analyzed or processed for multiple different components or subsystems simultaneously. In the example described herein, it will be described as being processed for each individual subsystem, sequentially, although this is only one example.

Thus consumption analysis component 134 selects a subsystem for power consumption processing. This is indicated by block 284. In this example, where machine 100 is a combine, the subsystems can include a wide variety of different subsystems. For instance, they can include a threshing subsystem 286, a separating subsystem 288, a cleaning subsystem 290, a residue processing subsystem 292, a propulsion subsystem 294, a front-end equipment subsystem 296, a material handling subsystem 298, or any of a variety of other subsystems 300.

As briefly described above with respect to FIG. 2, the threshing subsystem 286 may include the concave and threshing rotor, along with the functionality that is used to adjust the rotor speed, the concave clearance, or other threshing components. The separating subsystem 288 may include the separating rotor or other items in the separating subsystem, along with the functionality that is used to control those items. The cleaning subsystem 290 may illustratively include the cleaning fan, the chaffer and sieve, and the functionality that is used to control the fan speed, and the chaffer and sieve openings, among other items. The residue processing system 292 may include the chopper, the spreader, and the functionality used to control the chopper and spreader. The propulsion subsystem 294 may include the moto, driving the wheels (or tracks) or other items. The front end equipment subsystem 296 can include the header, cutter, the things that drive them, and other things. The material handling subsystem 298 can include the feederhouse, the feed accelerator, the discharge beater, the tailings elevator, the clean grain elevator, the unloading auger and the things that power them, etc.

Conditioning component 140 then receives a power detector input from the selected subsystem. This is indicated by block 302. For example, the power detector input can be a direct measurement of power consumption for the selected subsystem. This is indicated by block 304. It can also be a signal indicating a variable value that is related to power consumption, so that power consumption can be calculated or estimated from that value. This is indicated by block 306. It can be a wide variety of other signals as well, as indicated by block 308.

In addition, where multiple components consume power in the selected subsystem, there can be one or more signals that indicate (either through direct measurement or through some variable value) the power consumed by those individual components. Alternately, or in addition, the signal or signals can be an aggregate of the power consumed by all of the components in a subsystem. All of these are contemplated herein.

Conditioning component 140 then performs any conditioning on the detector input that has been received. This is indicated by block 310. For instance, where multiple components provide signals indicative of power consumption of the individual components of a subsystem, the signals can be aggregated to obtain an aggregate signal indicative of the overall power consumption of the subsystem. This is indicated by block 312. The individual signals can be conditioned, individually, as well. In addition, conditioning component 140 can perform amplification 314, linearization 316, normalization 318, or other compensation or other signal conditioning functions 320.

Consumption identifier component 142 then identifies or generates a metric value indicative of a power consumption of the selected subsystem. This is indicated by block 322. For instance, it can generate a metric indicative of the direct measurement of power consumption, if that is the input provided by the subsystem power detector. Providing the metric as a direct measurement value is indicated by block 324. It can also provide an estimate of the power consumption using a model, or another type of estimating mechanism. This is indicated by block 326. For instance, where direct power consumption cannot be measured (or is not measured), then some variable values that are indicative of power consumption can be provided, and the power consumption can be calculated or estimated based on those values. As one example, empirical instrumentation data can be used to generate an empirical model for estimating power consumption when it cannot (or is not) directly measured. Easier-to-measure variables can be detected and the sensed values for those variables are used as an input to the empirical model. The model returns an estimate of power being consumed by the corresponding subsystem. As but one example, the power consumption of the rotor can be estimated by measuring the pressure needed to maintain the rotor drive sheave position and by measuring or sensing the rotor speed. These values can be input to a model that uses them to estimate the rotor power consumption. In another example, the rotor speed, the concave position and the feed rate of material entering the combine can all be detected or sensed, and those values can be used to access the model, to get a rotor power consumption value. These are examples only.

It will be noted that the metric values indicative of the power consumption for the selected subsystem (or for the individual components of the selected subsystem) can be derived in other ways as well, and this is indicated by block 328.

Visualization generator component 136 then generates a visualization of the metric value (or values) for the selected subsystem. This is indicated by block 330. The visualization, for instance, can be a raw numeric value 332. It can be indicia that show the power consumption of the selected subsystem as a percent of its maximum power consumption. This is indicated by block 334. It can be a measure of the power consumed by the selected subsystem relative to (or in proportion to) other subsystems on the machine. This is indicated by block 336. The visualization can be generated to show other items as well, and this is indicated by block 338.

Visualization generator component 136 then controls user interface system 112 to surface that visualization for operator 120. This is indicated by block 340 in FIG. 3. The visualization can be surfaced in a wide variety of different ways. It can be surfaced as an alpha-numeric value 342, or as a chart 344 (such as a pie chart, a bar chart, or other charts). In addition, the visualization can be correlated to a visual representation of the machine. This is indicated by block 346. It can be color-coded as indicated by block 348, or it can be provided with other dynamic elements, such as blinking, fading in and out of view, etc. This is indicated by block 350. The visualization can be surfaced in other ways as well, and this is indicated by block 352.

It should be noted that, in one example, power consumption surfacing system 108 can also control user interface system 112 to generate a variety of other outputs. This is indicated by block 354 in FIG. 3. Such outputs, for instance, can include audio outputs 356, haptic outputs 358, outputs to a local or remote storage system 360, output to communication component 114 for transmission to one or more remote systems 118, or other outputs 362.

At some point, power consumption surfacing system 108 determines whether there are any more subsystems that have power consumption data that is to be processed at this time. This is indicated by block 364. If so, processing reverts to block 284 where the next subsystem (or set of subsystems) is selected for processing.

Figure 5:
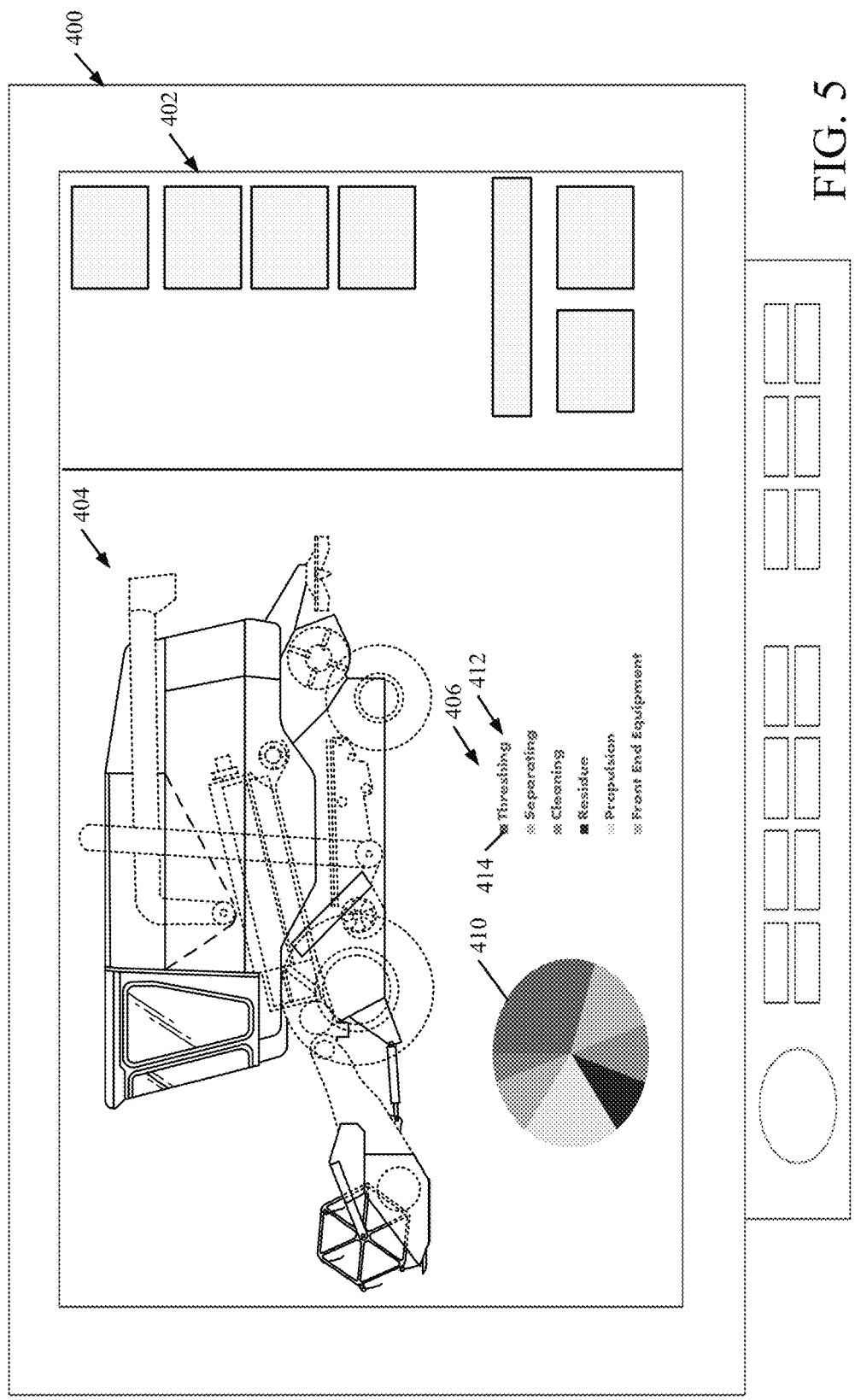
Figure 6:
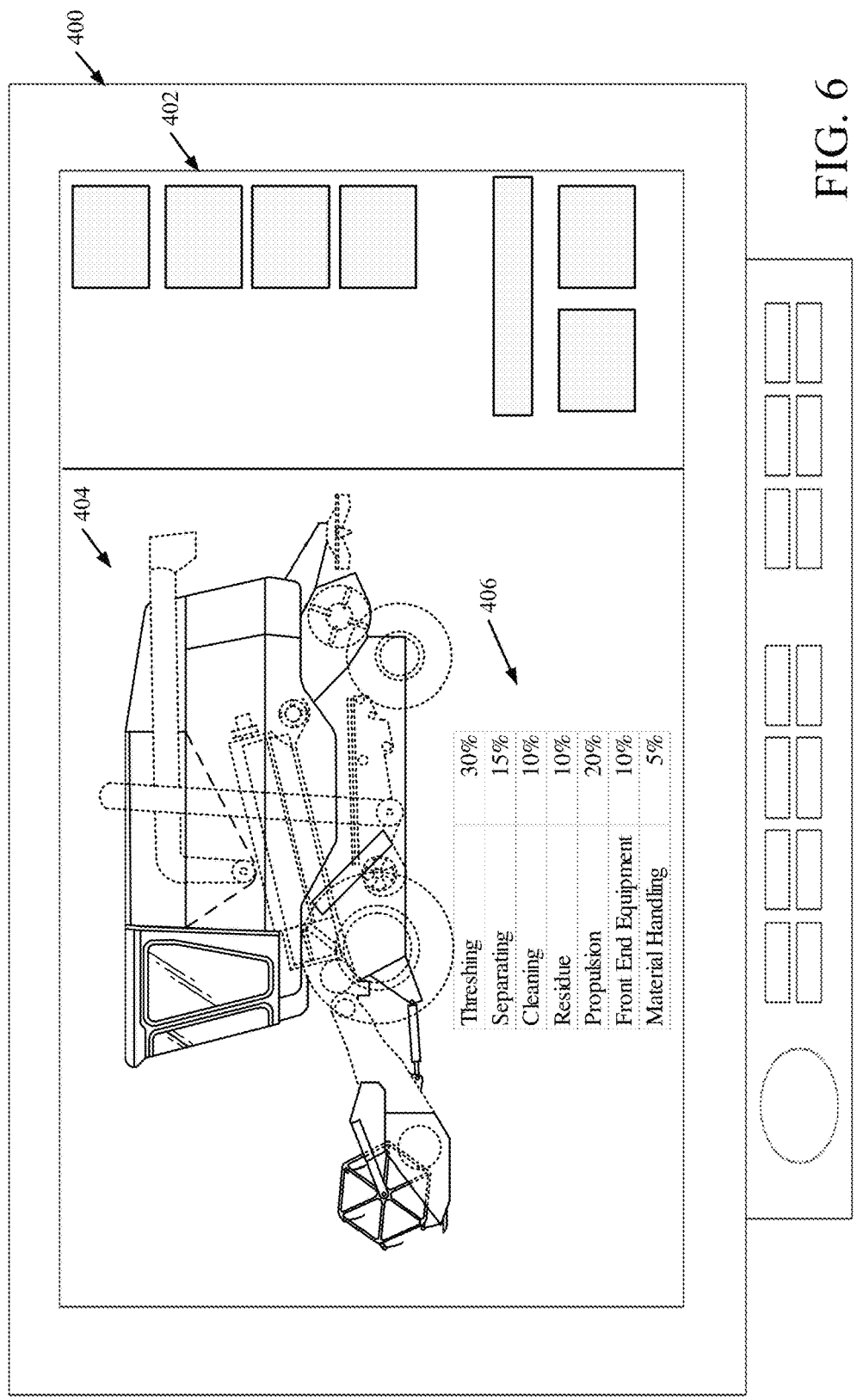

FIGS. 4-6 show a number of different visualizations that can be generated by visualization generator component 136, to display power consumption, on a subsystem-by-subsystem basis. FIG. 4 shows that, in one example, the user interface output mechanism is a user interface display device 400. Display device 400 illustratively generates a user interface display 402 that has a machine display portion 404 and a power consumption display portion 406. In one example, each of the subsystems on the machine can be visually shown on machine display portion 404 (either individually or in one or more groups). In one example, they can be distinguished from one another by visual indicia. For instance, they can be color-coded, shown using different types of line thicknesses or line formatting (e.g., spacing, dotted lines, etc.), or in other ways. In addition, the specific subsystems (or components of subsystems) for which power consumption data is shown in power consumption display portion 406, can be shown in darker lines, while the other subsystems can be shown in ghost (e.g., grayed out) lines, etc. All of these, and other display techniques, are contemplated herein.

FIG. 4 also shows that, in the visualization illustrated, the power consumption display portion 406 shows total power consumption for individual components of different subsystems as a percent of the total power consumption of all of the illustrated subsystems. Thus, the power consumption of the chopper, the rotor, the clean grain elevator and the cleaning fan are all shown separately. They are shown as bar graphs. It will be noted, however, that they could be shown by illustrating the percent of maximum power consumption for that individual component that is currently being consumed. For instance, in the example shown in FIG. 4, if power consumption display portion 406 was displaying the power consumed by the chopper, as a total percent of its maximum power consumption, the display in FIG. 4 would indicate that the chopper was operating at approximately 15% of its maximum power. The cleaning fan, on the other hand, would be operating at approximately 85% of its maximum.

FIG. 5 is another example of a visualization that can be generated by visualization generator component 136. In FIG. 5, the machine display portion 404 is similar to that shown in FIG. 4. However, the power consumption display portion 406 shows a different visualization. In the example shown in FIG. 5, the power consumption is illustrated by pie chart 410. Different slices of the pie chart 410 are color-coded to corresponding colors associated with the different subsystems illustrated in a subsystem display portion 412. Each subsystem in the subsystem display portion 412 has a colored box 414 associated with it. The colored boxes correspond to the colors in pie chart 410. Thus, the pie chart shows an overall amount of power consumed by each of the subsystems shown at 412, relative to the other subsystems, and relative to the total power consumed by all subsystems. In one example, the illustration shown in machine display portion 404 is also color-coded. Therefore, each of the components of the machine are outlined (or shaded) by a color that corresponds to the particular subsystem that is belongs to. The components of the threshing subsystem will thus have the same color as shown in power consumption display portion 406 and subsystem display portion 412. The same will be true of the separating subsystem, the cleaning subsystem, the residue handling subsystem, the propulsion subsystem, and the front-end equipment subsystem, etc.

FIG. 6 shows yet another example of a visualization that can be generated by visualization generator component 136. In the example shown in FIG. 6, the machine display portion 404 is similar to that shown in FIGS. 4 and 5. However, the power consumption display portion 406 displays a numerical value, for each subsystem, that indicates the percent of the total power (i.e., the power consumed by all subsystems) that is consumed by the individual subsystems. For example, FIG. 6 shows that the threshing subsystem is currently consuming 30% of the overall power consumed by all of the subsystems together. The separating subsystem is consuming 15%. The cleaning subsystem and residue handling subsystem are both consuming 10%. The propulsion subsystem is consuming 20%, while the front-end equipment subsystem is consuming 10% and the material handling subsystem is consuming 5%.

It will also be appreciated that, in one example, the operator may be able to interact with the display 402 to obtain more detailed information. For instance, each entry in the list of subsystems shown in power consumption display portion 406 in FIG. 6 may be a user actuatable input mechanism (such as a link, or icon, etc.). Therefore, if the user actuates one of them, visualization generator component 136 may illustratively display the power consumed by the individual components of that subsystem. As an example, if the user actuates the cleaning subsystem entry in FIG. 6, the visualization generator component 136 may illustratively generate a visual display indicating the power that is currently being consumed by the cleaning fan, sieve components, and chaffer components (and their corresponding driving or control components). This is just one example of more detailed information that can be displayed based on a user interaction.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
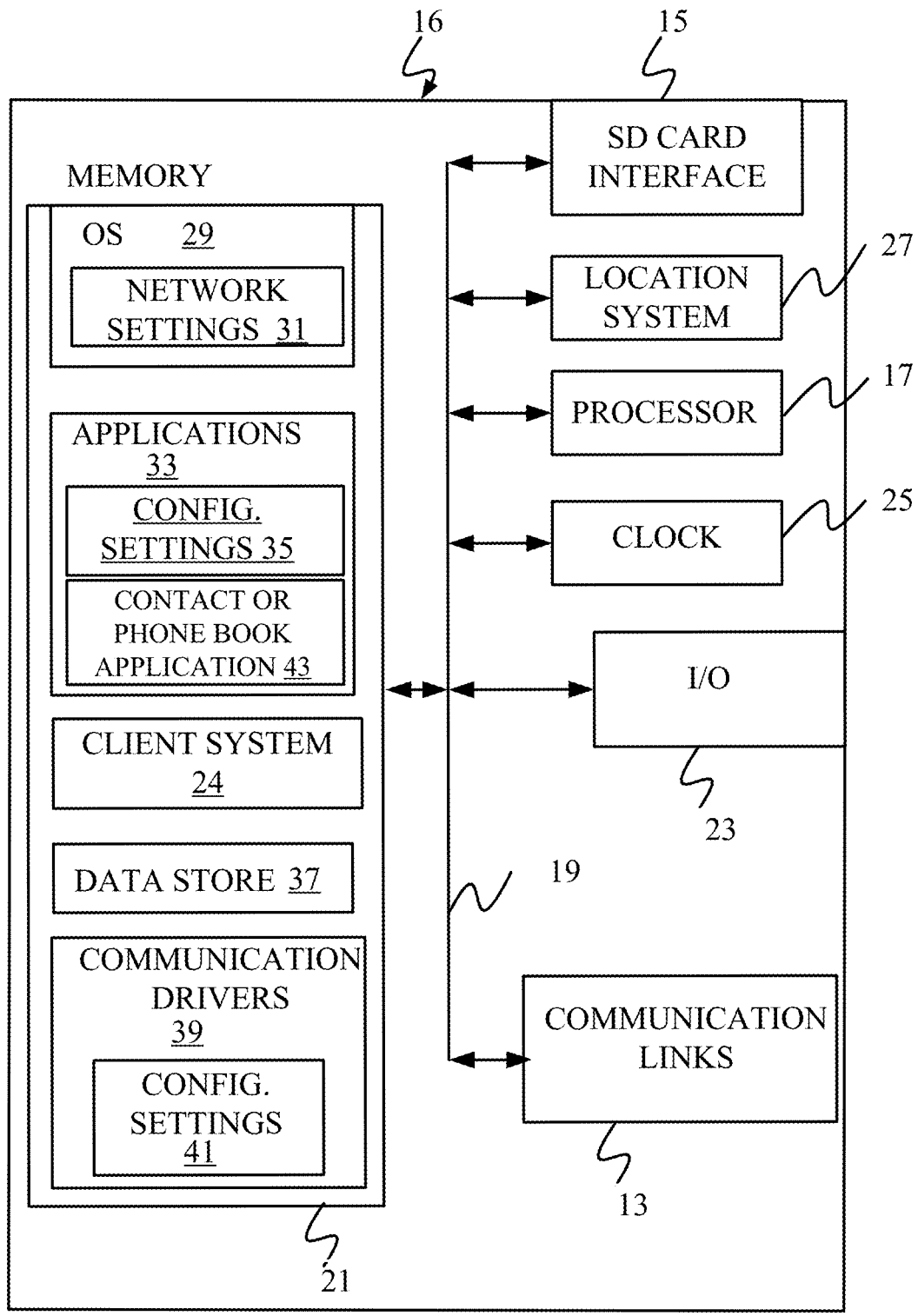
FIGS. 7-9 show examples of mobile devices, on which the power consumption data can be surfaced.
Figure 8:
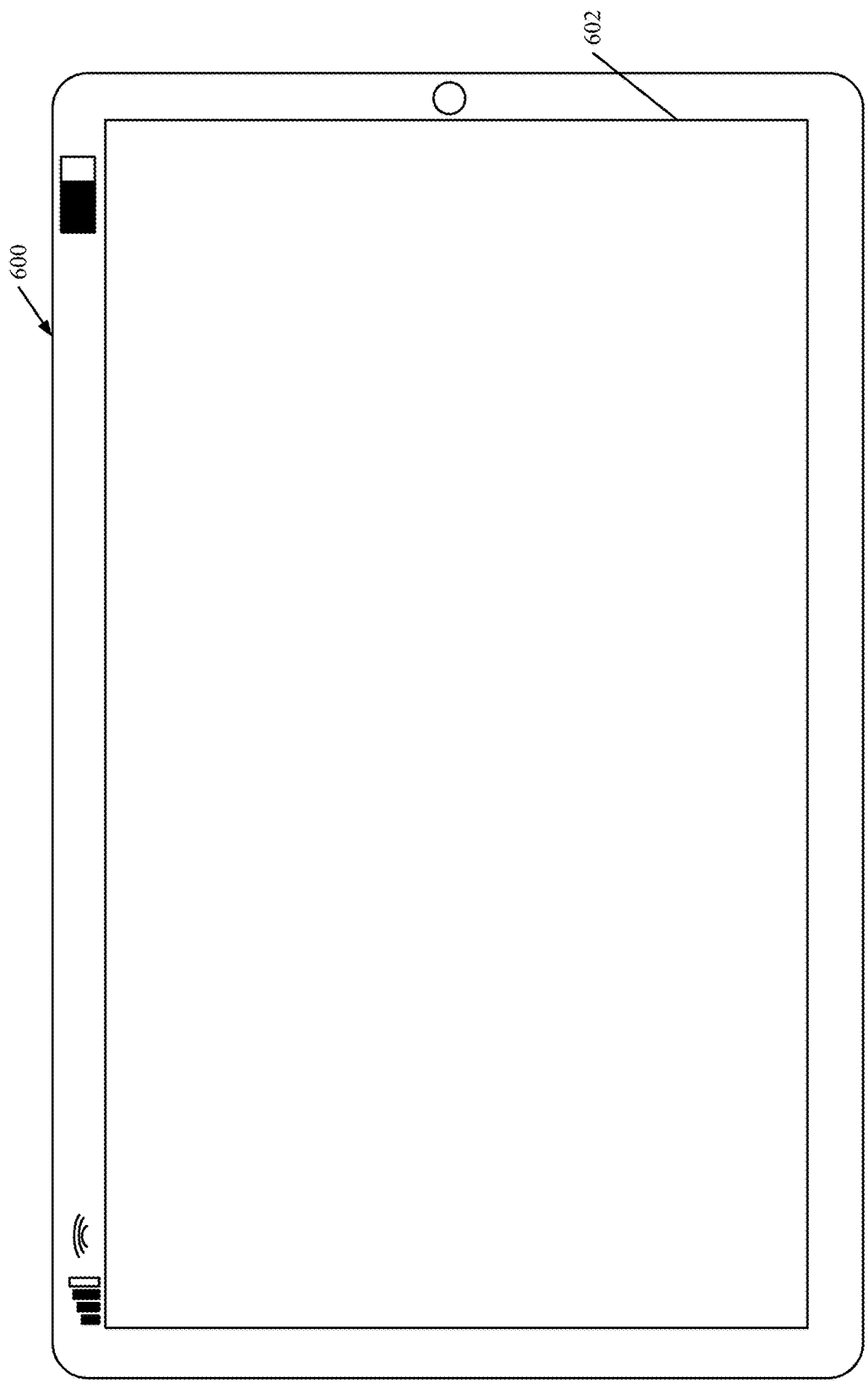
Figure 9:
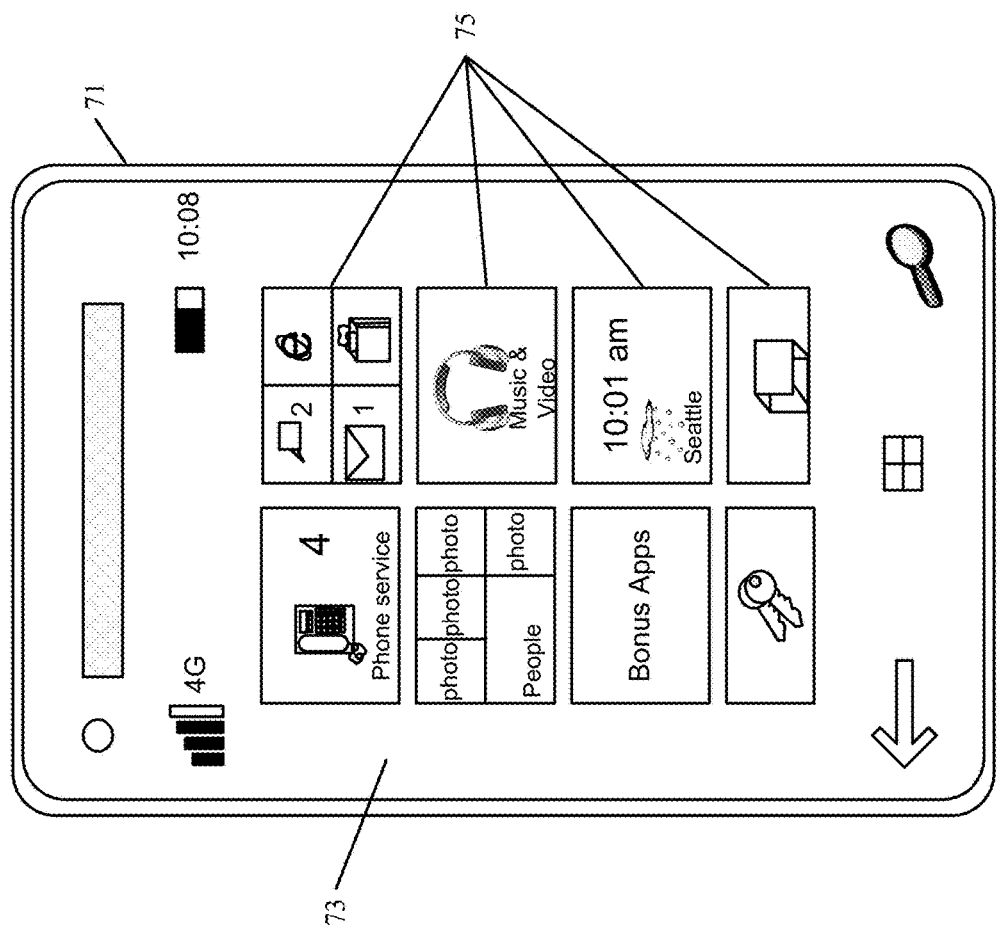

FIG. 7 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the power consumption data. FIGS. 8-9 are examples of handheld or mobile devices.

FIG. 7 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 106 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
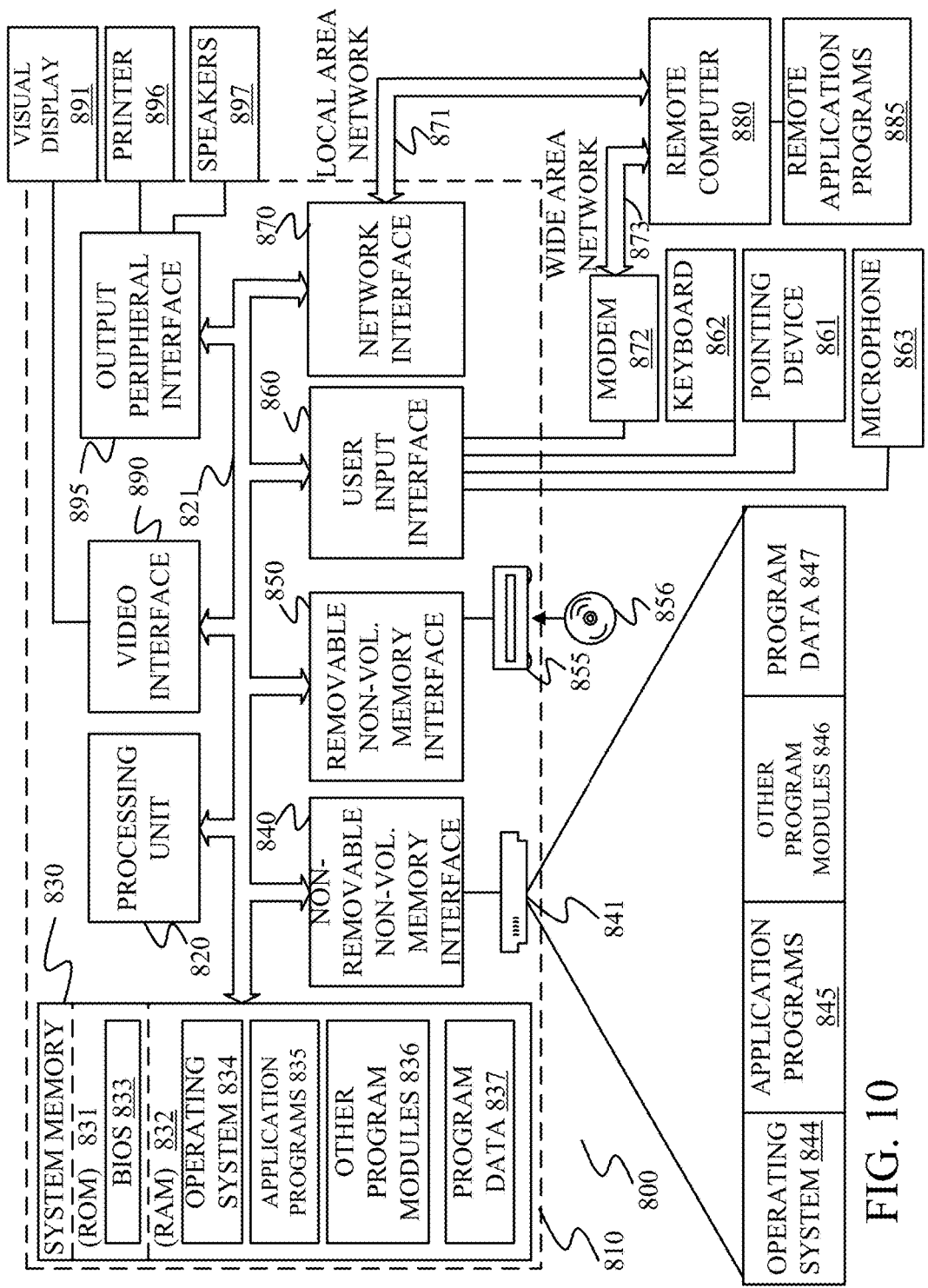
FIG. 10 is a block diagram of one example of a computing environment that can be used in the architectures shown in the previous figures.

FIG. 10 is one example of a computing environment in which elements of FIG. 1, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processor 106), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an agricultural machine, comprising:
a plurality of subsystems, each performing a function of the agricultural machine;
a plurality of power detectors, each power detector detecting a variable indicative of power consumed on a given subsystem, of the plurality of subsystems, and generating a corresponding power consumption signal indicative of the detected variable; and
a power consumption surfacing system that receives the power consumption signals from the plurality of power detectors and generates a visualization indicative of the power consumed by each of the plurality of subsystems.

Example 2 is the agricultural machine of any or all previous examples wherein the power consumption surfacing system comprises:
a consumption analysis component that identifies power consumption of each of the plurality of subsystems based on the power consumption signals.

Example 3 is the agricultural machine of any or all previous examples wherein the power consumption surfacing system comprises:
a visualization generator configured to generate the visualization to show a metric value corresponding to each subsystem, indicative of the power being consumed by the corresponding subsystem.

Example 4 is the agricultural system of any or all previous examples wherein the visualization generator generates the visualization with a machine display portion displaying a depiction of the agricultural machine and a power consumption display portion that displays the power being consumed by each subsystem.

Example 5 is the agricultural machine of any or all previous examples wherein the visualization generator generates the visualization with the machine display portion showing each of the plurality of subsystems on the depiction of the agricultural machine.

Example 6 is the agricultural machine of any or all previous examples wherein the visualization generator generates the visualization with visual indicia correlating the subsystems on the depiction of the agricultural machine to the metric values on the power consumption display portion indicative of the power being consumed by the subsystems.

Example 7 is the agricultural machine of any or all previous examples wherein the visualization generator generates the visualization with the visual indicia color coding the subsystems on the depiction of the agricultural machine with the metric values on the power consumption display portion indicative of the power being consumed by the subsystems.

Example 8 is the agricultural machine of any or all previous examples wherein the visualization generator generates the visualization with the power consumption display portion displaying the power being consumed by each of the subsystems on a chart.

Example 9 is the agricultural machine of any or all previous examples wherein the visualization generator generates the visualization with the power consumption display portion displaying the power being consumed by each of the subsystems as alphanumeric values.

Example 10 is the agricultural machine of any or all previous examples wherein at least a given one of the subsystems has a plurality of power consuming components and wherein the power consumption surfacing system generates the visualization to show power being consumed by the individual power consuming components.

Example 11 is the agricultural machine of any or all previous examples wherein the agricultural machine comprises a combine and wherein the subsystems comprise one or more of a threshing subsystem, a separating subsystem, a cleaning subsystem, a residue processing subsystem, a propulsion subsystem, a front end equipment subsystem, and a material handling subsystem.

Example 12 is a method of controlling an agricultural machine, comprising:
detecting a variable indicative of power consumed on a given subsystem, of a plurality of subsystems that each perform a function on the agricultural machine;
generating a corresponding power consumption signal indicative of the detected variable; and
surfacing a visualization indicative of the power consumed by each of the plurality of subsystems, based on the corresponding power consumption signals.

Example 13 is the method of any or all previous examples wherein surfacing comprises:
identifying power being consumed by of each of the plurality of subsystems based on the power consumption signals; and
generating the visualization to show a metric value corresponding to each subsystem, indicative of the power being consumed by the corresponding subsystem.

Example 14 is the method of any or all previous examples wherein generating the visualization comprises:
generating the visualization with a machine display portion displaying a depiction of the agricultural machine and a power consumption display portion that displays the power being consumed by each subsystem.

Example 15 is the method of any or all previous examples wherein generating the visualization comprises:
generating the visualization with the machine display portion showing each of the plurality of subsystems on the depiction of the agricultural machine and with visual indicia correlating the subsystems on the depiction of the agricultural machine to the metric values on the power consumption display portion indicative of the power being consumed by the subsystems.

Example 16 is the method of any or all previous examples wherein at least a given one of the subsystems has a plurality of power consuming components and wherein surfacing the visualization comprises:
surfacing the visualization to show power being consumed by the individual power consuming components of the at least one subsystem.

Example 17 is the method of any or all previous examples wherein the agricultural machine comprises a combine and wherein surfacing the visualization comprises:
surfacing the visualization to show power being consumed by a plurality of a threshing subsystem, a separating subsystem, a cleaning subsystem, a residue processing subsystem, a propulsion subsystem, a front end equipment subsystem, or a material handling subsystem.

Example 18 is the method of any or all previous examples wherein generating the visualization comprises:
generating the visualization with the visual indicia color coding the subsystems on the depiction of the agricultural machine with the metric values on the power consumption display portion indicative of the power being consumed by the subsystems.

Example 19 is an agricultural machine, comprising:
a plurality of subsystems, each performing a function of the agricultural machine;
a plurality of power detectors, each power detector detecting a variable indicative of power consumed on a given subsystem, of the plurality of subsystems, and generating a corresponding power consumption signal indicative of the detected variable;
a consumption analysis component that identifies power consumption of each of the plurality of subsystems based on the power consumption signals; and
a power consumption surfacing system that receives the identified power consumption and generates a visualization indicative of the power consumed by each of the plurality of subsystems.

Example 20 is the agricultural machine of any or all previous examples wherein the power consumption surfacing system comprises:
a visualization generator configured to generate the visualization with a machine display portion displaying a depiction of the agricultural machine and a power consumption display portion that displays the power being consumed by each subsystem, the visualization including visual indicia correlating the subsystems on the depiction of the agricultural machine to metric values on the power consumption display portion indicative of the power being consumed by the subsystems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A combine, comprising:
a threshing system;
a separating system;
a plurality of power detectors, a first power detector detecting a variable indicative of power consumed by the threshing subsystem, and a second power detector detecting a variable indicative of power consumed by the separating subsystem, each of the first and second power detectors generating a corresponding power consumption signal indicative of the detected variable;
a power consumption surfacing system that receives the power consumption signals from the first and second power detectors and generates a visualization indicative of the power consumed by each of the threshing and separating subsystems to an operator of the combine while the combine is in use;
wherein the variable indicative of power consumed by the threshing system corresponds to a component of the threshing system and the variable indicative of power consumed by the separating system corresponds to a component of the separating system.

2. The combine of claim 1 wherein the power consumption surfacing system comprises:
a consumption analysis component that identifies power consumption of the threshing subsystem and the separating subsystem based on the power consumption signals.

3. The combine of claim 2 wherein the power consumption surfacing system comprises:
a visualization generator configured to generate the visualization to show a first metric value corresponding to the threshing subsystem and a second metric value corresponding to the separating subsystem, the first and second metric indicative of the power being consumed by the corresponding subsystem.

4. The combine of claim 3 wherein the visualization generator generates the visualization with a machine display portion displaying a depiction of the combine and a power consumption display portion that displays the power being consumed by the threshing subsystem and the separating mechanism.

5. The combine of claim 4 wherein the visualization generator generates the visualization with the machine display portion showing each of the threshing and separating subsystems on the depiction of the combine.

6. The combine of claim 5 wherein the visualization generator generates the visualization with visual indicia correlating each of the threshing and separating subsystems on the depiction of the combine to the metric values on the power consumption display portion indicative of the power being consumed by each of the threshing and separating subsystems.

7. The combine of claim 6 wherein the visualization generator generates the visualization with the visual indicia color coding each of the threshing and separating subsystems on the depiction of the combine with the metric values on the power consumption display portion indicative of the power being consumed by each of the threshing and separating subsystems.

8. The combine of claim 5 wherein the visualization generator generates the visualization with the power consumption display portion displaying the power being consumed by each of the threshing and separating subsystems on a chart.

9. The combine of claim 5 wherein the visualization generator generates the visualization with the power consumption display portion displaying the power being consumed by each of the threshing and separating subsystems as alphanumeric values.

10. The combine of claim 1 wherein at least a given one of the threshing and separating subsystems has a plurality of power consuming components and wherein the power consumption surfacing system generates the visualization to show power being consumed by the individual power consuming components of the given subsystem.

11. The combine of claim 1 wherein the subsystems further comprise one or more of a cleaning subsystem, a residue processing subsystem, a propulsion subsystem, a front end equipment subsystem, and a material handling subsystem.

12. A method of controlling a combine, the method comprising:
detecting a variable indicative of power consumed on a threshing subsystem, of the combine;
detecting a variable indicative of power consumed on a propulsion system of the combine;
generating a corresponding power consumption signal indicative of the detected variable; and
surfacing a visualization indicative of the power consumed by each of the threshing and propulsion subsystems, based on the corresponding power consumption signals to an operator of the combine while the combine is in use.

13. The method of claim 12 wherein surfacing comprises:
identifying power being consumed by of each of the threshing and propulsion subsystems based on the power consumption signals; and
generating the visualization to show a metric value corresponding to each subsystem, indicative of the power being consumed by the corresponding subsystem.

14. The method of claim 13 wherein generating the visualization comprises:
generating the visualization with a machine display portion displaying a depiction of the combine and a power consumption display portion that displays the power being consumed by each subsystem.

15. The method of claim 14 wherein generating the visualization comprises:
generating the visualization with the machine display portion showing each of the threshing and propulsion subsystems on the depiction of the combine and with visual indicia correlating the subsystems on the depiction of the combine to the metric values on the power consumption display portion indicative of the power being consumed by the subsystems.

16. The method of claim 12 wherein at least a given one of the threshing and propulsion subsystems has a plurality of power consuming components and wherein surfacing the visualization comprises:
surfacing the visualization to show power being consumed by the individual power consuming components of the at least one given subsystem.

17. The method of claim 12 wherein surfacing the visualization comprises:
surfacing the visualization to show power being consumed by at least one of a separating subsystem, a cleaning subsystem, a residue processing subsystem, a front end equipment subsystem, and a material handling subsystem.

18. The method of claim 15 wherein generating the visualization comprises:
generating the visualization with the visual indicia color coding the subsystems on the depiction of the combine with the metric values on the power consumption display portion indicative of the power being consumed by the subsystems.

19. A combine, comprising:
a threshing subsystem;
a front end equipment subsystem;
a first power detector configured to detect power consumed on the threshing subsystem, and a second power detector configured to detect power consumed on the front end equipment subsystem, each of the first and second power detectors generating a corresponding power consumption signal indicative of the power consumed;

a consumption analysis component that identifies power consumption of each of the threshing and front end equipment subsystems based on the power consumption signals;

a power consumption surfacing system that receives the identified power consumption and generates a visualization indicative of the power consumed by each of the threshing and front end equipment subsystems to an operator of the combine while the combine is in use;

wherein the visualization comprises indicia of the power consumed by the threshing subsystem relative to the power consumed by the front end equipment subsystem.

20. The combine of claim 19 wherein the power consumption surfacing system comprises:

a visualization generator configured to generate the visualization with a machine display portion displaying a depiction of the combine and a power consumption display portion that displays the power being consumed by each of the threshing subsystem and the front end equipment subsystem, the visualization including visual indicia correlating the subsystems on the depiction of the combine to metric values on the power consumption display portion indicative of the power being consumed by the subsystems.

21. An agricultural machine comprising:

a controllable subsystem;

a first subsystem component;

a second subsystem component;

a first power detector configured to detect a first variable of the first subsystem component and generate a first power consumption signal indicative of power consumed by the first subsystem component based on the first variable;

a second power detector configured to detect a second variable of the second subsystem component and generate a second power consumption signal indicative of power consumed by the second subsystem based on the second variable;

a conditioning component configured to receive the first and second power consumption signals and generate a conditioned power consumption signal;

a power consumption surfacing system configured to receive the conditioned power consumption signal and aggregate the signal to determine a power consumption metric for the controllable subsystem; and a visualization generator component configured to generate a visualization indicative of the power consumed by the controllable subsystem based on the power consumption metric.

* * * * *